(12) United States Patent
Bhatt et al.

(10) Patent No.: US 12,154,287 B2
(45) Date of Patent: Nov. 26, 2024

(54) FRAMING IN A VIDEO SYSTEM USING DEPTH INFORMATION

(71) Applicant: Hewlett-Packard Development Company, L.P., Spring, TX (US)

(72) Inventors: Rajen Bhatt, Pittsburgh, PA (US); Poojan Patel, Phoenix, AZ (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 17/970,513

(22) Filed: Oct. 20, 2022

(65) Prior Publication Data

US 2024/0137641 A1 Apr. 25, 2024
US 2024/0233150 A9 Jul. 11, 2024

(51) Int. Cl.
*G06T 7/50* (2017.01)
*G06V 40/10* (2022.01)

(52) U.S. Cl.
CPC ............... *G06T 7/50* (2017.01); *G06V 40/10* (2022.01); *G06T 2207/10016* (2013.01); *G06T 2207/10028* (2013.01); *G06T 2210/12* (2013.01)

(58) Field of Classification Search
CPC .............. H04N 23/611; G06T 7/50; G06T 2207/10016; G06T 2207/10028; G06T 2210/12; G06V 40/10
See application file for complete search history.

(56) References Cited

U.S. PATENT DOCUMENTS

| 8,358,328 | B2 | 1/2013 | Friel et al. | |
| 2002/0118861 | A1* | 8/2002 | Jouppi | G06V 40/167 |
| | | | | 382/282 |
| 2018/0249124 | A1 | 8/2018 | Tangeland et al. | |
| 2023/0101399 | A1* | 3/2023 | Le | G06N 3/08 |
| | | | | 348/14.08 |
| 2023/0247073 | A1* | 8/2023 | Yu | H04N 23/667 |
| | | | | 348/14.08 |
| 2024/0013536 | A1* | 1/2024 | Hung | G06V 20/41 |
| 2024/0045574 | A1* | 2/2024 | Nagpal | G10L 25/78 |
| 2024/0119731 | A1* | 4/2024 | Hammer | G06V 20/41 |

* cited by examiner

*Primary Examiner* — Michael Lee
(74) *Attorney, Agent, or Firm* — Quarles & Brady LLP

(57) ABSTRACT

A method may include obtaining, using a head detection model and for an image of a video stream, head detection information for heads detected in the image. The head detection information may include depth distances of the heads. Method may also include obtaining bounding boxes, where obtaining the bounding boxes may include obtaining head bounding boxes for the heads detected in the image, and combining at least two of the head bounding boxes into a combined bounding box according to the depth distances. Method may furthermore include creating, individually, head frame definitions for the bounding boxes, and processing the video stream using the head frame definitions.

19 Claims, 9 Drawing Sheets

Room Setup

Camera View

FRAMING IN A VIDEO SYSTEM USING DEPTH INFORMATION

BACKGROUND

Video systems capture and process video streams. A video stream is a sequence of images captured by at least one camera. For example, a video system may be a conferencing system or a part of a conference system, or a video system may be used to capture a video stream for later playback. In some cases, the video system uses a video stream from one or more cameras, where the video stream is of multiple people in a same room. In such a scenario, the video system may perform framing operations to modify the video stream. Framing operations changes the view of a video stream, such as by cropping the images and zoom in on a portion of the images.

SUMMARY

In one general aspect, a method may include obtaining, using a head detection model and for an image of a video stream, head detection information for heads detected in the image. The head detection information may include depth distances of the heads. Method may also include obtaining bounding boxes, where obtaining the bounding boxes may include obtaining head bounding boxes for the heads detected in the image and combining at least two of the head bounding boxes into a combined bounding box according to the depth distances. Method may furthermore include creating, individually, head frame definitions for the bounding boxes, and processing the video stream using the head frame definitions.

In one general aspect, system may include a video processor having a head detection model configured to generate head detection information for an image of a video stream. The head detection information may include depth distances of the heads. The system may also include, a frame generator configured to generate head frame definitions for the image of the video stream, where generating the head frame definitions may include obtaining bounding boxes, where obtaining the bounding boxes may include obtaining head bounding boxes for the heads detected in the image and combining at least two of the head bounding boxes into a combined bounding box according to the depth distances. Generating the head frame definitions also include creating, individually, head frame definitions for the bounding boxes. The video processor may also include an image framing processor configured to process the video stream using the head frame definitions.

In one general aspect, method may include obtaining, using a head detection model and for an image of a video stream, head detection information having head bounding boxes for heads detected in the image, where the head detection information further may include depth distances for the heads. The method may also include filtering the head bounding boxes based on the depth distances satisfying a filter threshold to obtain a filtered head bounding boxes, combining at least two of the filtered head bounding boxes into a combined bounding box according to the depth distances. The method may in addition include creating a head frame definition for the combined bounding box and processing the video stream using the head frame definition.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
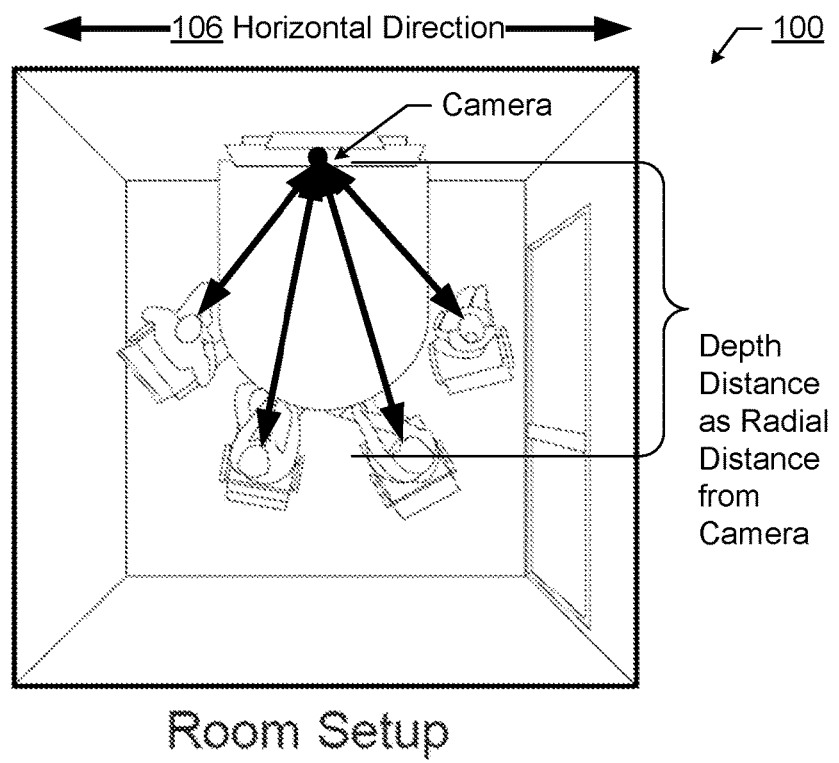
FIGS. 1 and 2 show an example configuration of a room and a view of a camera with dimensions.
Figure 1:
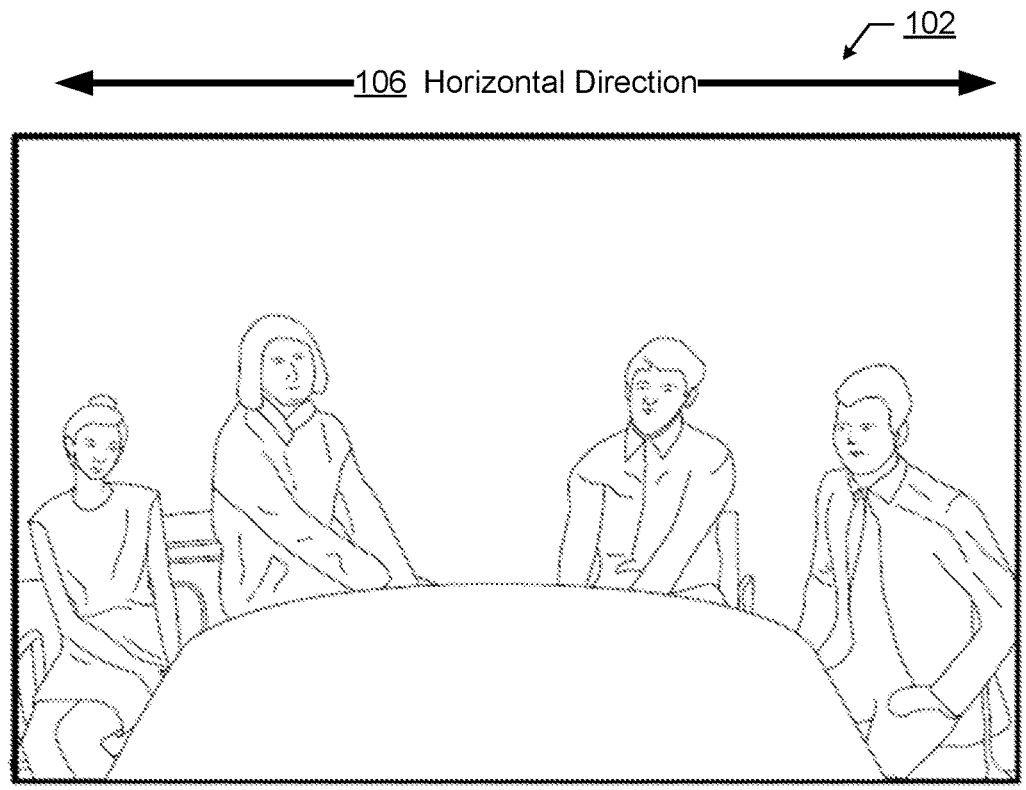

In general, embodiments of the disclosure are directed to performing, by a video system, framing of multiple heads in conference room according to location of people in a conference room. The video system is any system in which a video stream is captured by a camera, such as a conference call, video recording, or a live single room conference or gathering which is captured by a camera. A frame is portion of an image of a video stream. Specifically, a frame is a sub-image of an image of the video stream.

Many room cameras for conference rooms have field of view that covers substantially the whole room. Thus, when people are in meetings in a conference room, the conference room's camera captures the whole room view. Images of people in the conference room may be an uneven size as compared to each other because the perspective of people further away from the camera may be substantively smaller than people closer to the camera. Additionally, if subsets of people are spaced apart from each other in the room (e.g., because a large table is in the room), then the whole room view includes substantively empty space. Accordingly, the sending of the whole room view creates an experience at a far end display where the end user sees much of the room environment (i.e., unused areas of the room), some larger heads of some people and some smaller heads of the people further in the room.

In cases in which everyone in the room actively or passively participates in the meeting, a meeting inequity can result where a focus is drawn to participants close to the camera and less focus is provided on participants that are away from the camera.

In some cases, the people in the back of the room may be present for their own edification or for reasons of the people in the room, but unimportant to the meeting. In such cases, movement by the people can detract from the meeting.

In order to address these issues, depth-based framing may be used. Depth-based framing is a technique that frames based on the depth distance of individuals. For example, depth-based framing may group individuals into a same frame based on being within the same range of depth distance of each other. Similarly, depth based framing may apply a visual fence, whereby individuals greater than a filter distance may be excluded from a frame.

Depth-based framing includes generating head frames and combined frames. A head frame may be a single head frames and combined frames. Single head frames are multiple frames for the different people in a conference room, whereby the focus of the frame is a single person's head. With single head frame, an individual person in the conference may have their own frame, even though the conference room has multiple people.

Combined frames are frames for a subset of people in the room based on the subset being in the same depth distance range of each other. Combined frames may also be based on general adjacency (e.g., not separated in the image by people that are at a farther depth distance). Combined frames may have a subgroup of people that have similar depth distance in the room. The combined frame provides a more optimal viewing experience of that group.

The multiple individual frames of the conference room are concurrently transmitted. In at least some embodiments, the concurrent transmission is grouping the head frames into an image frame.

To perform depth-based framing, one or more embodiments use a machine learning model that identifies the heads of people in the room from an image. For each head, a head bounding box is obtained. Head bounding boxes that are determined to be in the same depth distance range to each other are combined into a combined bounding box. Thus, the bounding boxes include at least one combined bounding box and may include single head bounding boxes. The bounding boxes are each used to define the location and the zoom level for the head frame. The location and the zoom level for the head frame is added to a head frame definition.

The collection of head frame definitions define which portions of an image of a video stream is transmitted and which portions of the video stream is not transmitted. Notably, while each portion is contiguous in a particular head frame, the portions may be separate or overlapping from each other portion. Thus, the head frame definitions may be applied to a video stream to generate an output video stream to send to a downstream device.

Figure 2:
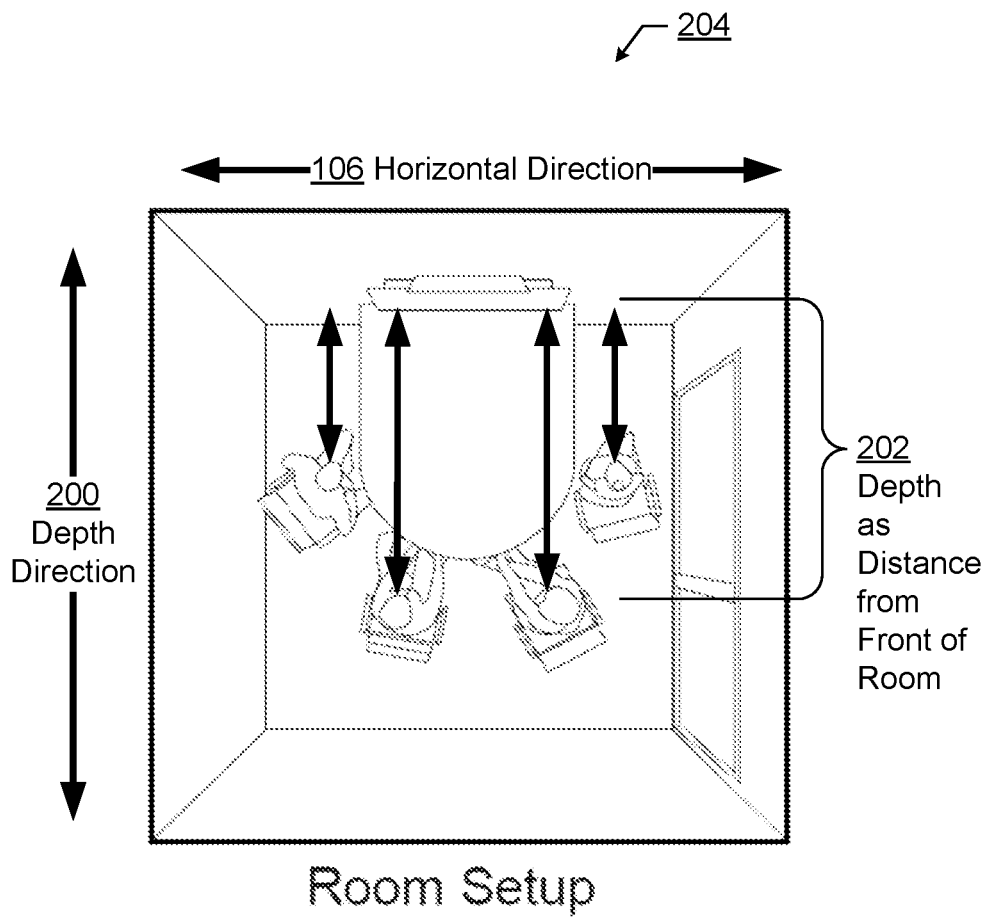

By way of nomenclature, FIGS. 1 and 2 show an example configuration of a room and a view of a camera with dimensional information. FIG. 1 shows a room setup (100), which is a top down view of the room, and a camera view (102) of the room. As shown in the camera view (102), the vertical direction (104) is with respect to the camera and refers to the vertical direction within an image. The vertical direction corresponds to the direction from the ceiling to the floor of the room. The horizontal direction (106) is with respect to the camera and is the horizontal direction (106) in an image. The horizontal direction is from one side of the room to the other.

The depth direction is shown in the room setup (100). Depth is defined based on the location of people not with respect to each other, but rather with respect to the room. In FIG. 1, the depth direction is the direction radiating outward from the camera. Depth distance (108) is the distance of individuals from the camera in the embodiment of FIG. 1. In some embodiments, depth distance may be from the face of the individual or the closest portion of the individual to the camera. Depth distance is an estimated distance in one or more embodiments. FIG. 2 is a top down view of the room (204) showing an alternative definition of depth direction (200) and depth distance (202). In FIG. 2, the depth distance (202) is the portion of the depth distance of FIG. 1 that is orthogonal to the horizontal direction. For example, the depth distance may be the distance from the front of the room at which the camera is located, or the distance from a plane of the camera.

Regardless of whether the definition of FIG. 1 or the definition of FIG. 2 is used for depth distance, depth distance is the location of the individual with respect to the camera and the room. Namely, depth distance is the defined by the distance of the person with respect to the camera even if the depth distance excludes the portion in the horizontal direction. As discussed above, depth-based framing is a framing technique of a video system that is based on depth distance.

Figure 3:
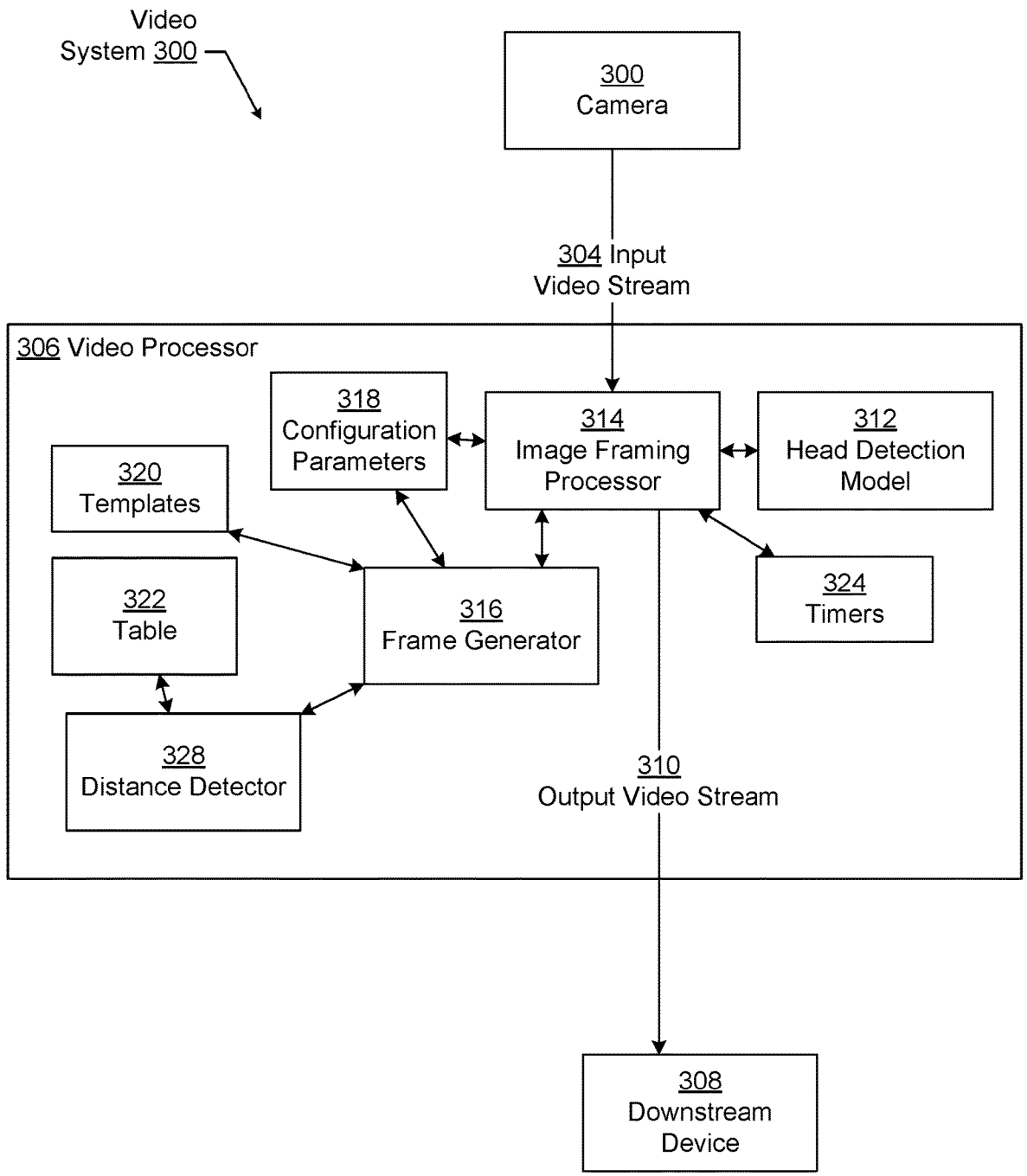
FIG. 3 shows a diagram of a system in accordance with one or more embodiments.
Figure 10:
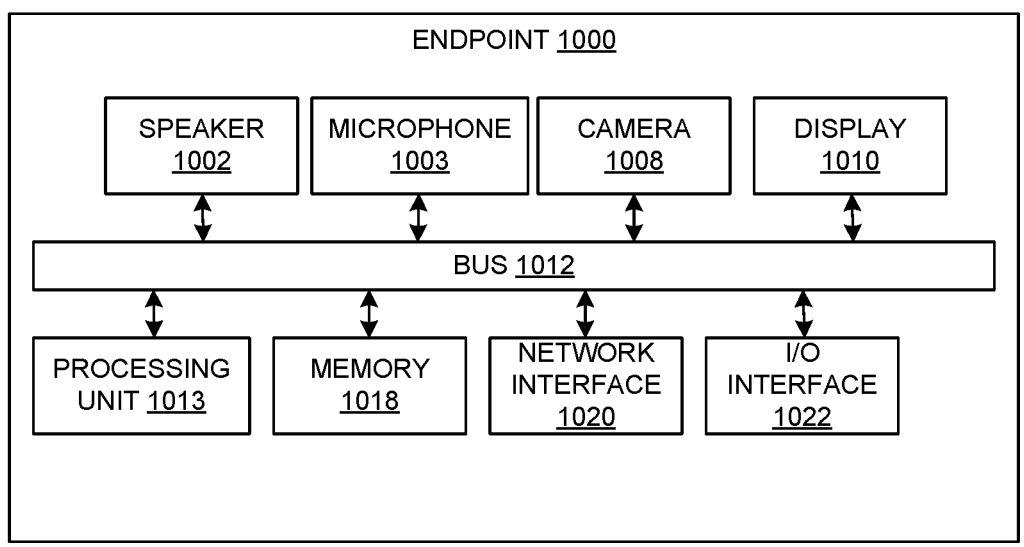
FIG. 10 shows an endpoint in accordance with one or more embodiments.

FIG. 3 is a diagram of a video system (300) configured to performed depth-based framing in accordance with one or more embodiments. As shown in FIG. 3, the video system (300) may include a camera (302) connected to a video processor (306). The camera (302) may correspond to any type of camera that captures an input video stream (304), such as a webcam, a conference endpoint camera (e.g., as shown in FIG. 10), a standalone camera, or any other type of camera.

The camera (302) is communicatively connected to a video processor (306). The video processor (306) includes hardware or software that is configured to process the input video stream (304) and produce the output video stream (310). For example, the video processor (306) may be a computing system or an application in memory or on a non-transitory computer readable medium, such as described in FIG. 10. As another example, the video processor (306) may be a hardware processor, associated memory, and firmware integrated into the housing of the camera (302). As another example, the video processor (306) may be a conference system server or a component thereof that is an intermediary between the conference endpoints. As another example, the video processor (306) may be a video editing application. Other types of video processors may be used without departing from the scope of the disclosure.

Continuing with FIG. 3, the input video stream (304) is a video stream that is input into the video processor. The use of the term "video stream" corresponds to a standard definition used in the art. Namely, the video stream includes a sequence of images ordered in time from a continual video capture by the camera (302). If multiple cameras are present, the multiple cameras may create a single video stream that includes, for example, additional information such as depth. The video stream may include audio and other information. For nomenclature purposes, the input video stream is a sequence of input images, and the output video stream has a sequence of output images.

The output video stream (310) is a video stream that is output produced by the video processor (306). The images in the video stream include output frames. An output frame may focus the view in the camera on a single individual, a group of individuals, or a subgroup of individuals based on depth (i.e., depth-based frame). A group frame is a framing technique in which a single output image shows the group of the individuals in the conference room as a contiguous image. The group frame may include all participants (i.e., group members or members of the group) as a single unbroken image regardless of depth distance. For other types of framing such as head framing and depth-based framing, a single output image may include multiple frames, where each of the multiple frames is a sub-image that corresponds to a single portion of the video stream captured by the camera.

In the output video stream, an output image may be a composite of the frames that form the output image as a single image. In such a scenario, from the downstream device perspective, the output image of the output video stream appears as a single image within the video stream. As another example, the frames of an output image may be encoded and transmitted as separate images to be combined by the downstream device (308). In such a scenario, the positioning of the frames within the output image may be specified as metadata with the separate images.

The video processor (306) may include additional components for other type of processing. For example, the additional processing may include filtering, various detection operations, and other operations. The additional processing may be performed as a preprocessing, at the same time, or in parallel with the processing described in the present application.

The video processor is communicatively interposed between the camera (302) and the downstream device (308). The downstream device (308) may be a storage device, a conference endpoint, a conferencing system server that is an intermediary between two or more conferencing endpoints, a computing system, or other device that receives the output video stream (310).

Returning to the video processor (306), the video processor (306) includes a head detection model (312), an image framing processor (314), a frame generator (316), a distance detector (328), table (322), templates (320), timers (324), and configuration parameters (318). Each of these components is described below.

The head detection model (312) is a machine learning model that is trained to detect heads in an image of the input video stream (304). The head detection model (312) may be, for example, a convolutional neural network that operates on an image (e.g., an image extracted from the input video stream (304)). The head detection model (312) may use information from sub-sequence of images in the input video stream (304). The output of the head detection model (312) includes the locations of the heads of people in the image. For example, the locations may be denoted by bounding boxes around the heads of people in an image. Although a head detection model is described, a face detection model or a person detection model may be used without departing from the scope of the technology.

The image framing processor (314) is connected to the head detection model (312). The image framing processor (314) uses the location of the head detection model to determine whether an initial framing or re-framing should be performed. An initial framing may be performed based on configuration parameters (318) or the output of the head detection model. Reframing may be performed based on configuration parameters (318), movement of people (e.g., within the frames or into or out of the frames or conference room), and timers (324).

The timers (324) may be hardware or software timers that are each configured to trigger an event when a certain amount of time has elapsed. The timers (324) are frame timers specifying when to reframe. The initiation of the timers is triggered by the detection of an event by the image framing processor (314). Multiple different timers may exist. For example, some timers may be based on a person leaving a room, while another timer is for.

If the image framing processor (314) determines to perform reframing, the image framing processor (314) may trigger the frame generator (316). If the image framing processor (314) determines that an initial framing or reframing should not be performed, then the image framing processor (314) may use the prior output (e.g., the head frame definitions and image frame definitions) of the frame generator (316) to generate the output images in the output video stream (310). In some cases, the reframing may be a complete reframing, by determining a layout and generating new head frame definitions for the heads. In other cases, such as in the case of a single head moving slightly outside of a frame or multiple heads moving closer together, the reframing is only on the corresponding head frame definition.

The frame generator (316) uses, as input, an input image and locations of people specified by the head detection model (312) as well as the depth distances of people from the distance detector (328). The frame generator (316) generates head frame definitions and an image frame definition as output. The head frame definition defines the boundaries of each frame within the input image and zoom level for each frame. In particular, for a head or subset of heads that are combined (e.g., based on depth distances), the head frame definition specifies the sub-image of the input image that forms the frame as well as the zoom level for the sub-image. Thus, the head frame definition may be a bounding box for each frame, a zoom level, and the position.

The image frame definition identifies each of the head frame definitions and assignments of the head frame definitions to locations in the image frame. Specifically, the image frame definition identifies, for each particular head frame definition, the particular position to place the head frames corresponding to the head frame definition.

The frame generator (316) may include or generate image frame layouts and one or more templates (320). In one or more embodiments, the image frame layouts (i.e., layout) defines how head frames fit into the dimensions of an image of the video stream that is transmitted. For example, if the dimension of the image is 16:9, then the image frame layout specifies a layout of the 16:9 region that includes multiple head frames. The layout may specify a vertical and/or horizontal centering of head frames, a right or left alignment of one or more head frames, or other specification of how various size head frames fit within the image frame. The video processor (306) may generate or have multiple layouts, whereby each layout corresponds to a number of head frames within the image.

A template (320) specifies how head bounding boxes fits within the head frame. For example, the template may have a top headline specifying where the top of the topmost head bounding box is to be placed and a bottom headline specifying where the bottom of the bottom most head bounding box is to be placed. As another example, the template may have a left headline specifying where the left side of the leftmost head bounding box is to be placed and a right headline specifying where the right of the right most head bounding box is to be placed. The templates may be defined with absolute sizes or relative sizes. For example, the absolute sizes may specify the exact dimensions of the headframe while relative sizes may specify percentages of with respect to the dimensions of the headframe. Multiple templates may be defined, whereby each template corresponds to different relative dimensions of height and width.

Although FIG. 1 presents the image framing processor (114) and the framing generator (116) as separate components, the image framing processor (114) and frame generator (116) may be combined into a single component that operates as a single unit. Further, the template (120) may be part of the frame generator (116).

The distance detector (328) is configured to estimate the depth distances of individuals in an image. The distance detector (328) may perform the detection, for example, algorithmically, such as based on the head bounding box of the individual. Because people farther from the camera are smaller in the image, the size of the person's head may be indicative of the depth distance of the person. The distance detector (328) is configured to individually augment each head bounding box with the corresponding depth distance. The augmented head bounding boxes are used as input to the frame generator (316).

In some embodiments, the distance detector (328) may be connected to a table (322). The table (322) relates, for multiple combinations of various heights and various widths, a height and a width of head bounding box with a corresponding depth distance. Thus, the table provides the closest match to depth distance. In other embodiments, the distance detector (328) may be configured to calculate a mathematical function based on an expected size of the head in actuality and the size of the head in the image.

The frame generator (316) may also use configuration parameters (318) to perform framing. The configuration parameters (316) may include a fencing threshold. The fencing threshold is a maximum depth distance to consider a person's head bounding box when performing framing. In some embodiments, the person's head may be inadvertently in a head frame based on adjacency with a near person. As another example, the person's bounding box may be excluded, blurred, or otherwise hidden from the frames. In another example, the configuration parameters (318) include one or more distance thresholds. A distance threshold specifies a difference in depth distances by which two head bounding boxes are combined. The distance threshold may be a maximum depth distance or defined using ranges. As an example, a maximum depth distance may be that head bounding boxes within five feet of each other are grouped. Ranges may specify that head bounding boxes having depth distances of zero to five feet are combined, head bounding boxes having depth distances of five feet to ten feet are combined, and head bounding boxes greater than ten feet are combined. Other values for distance thresholds may be used, and other techniques may be used for defining when to combine head bounding boxes based on depth distances.

Figure 4:
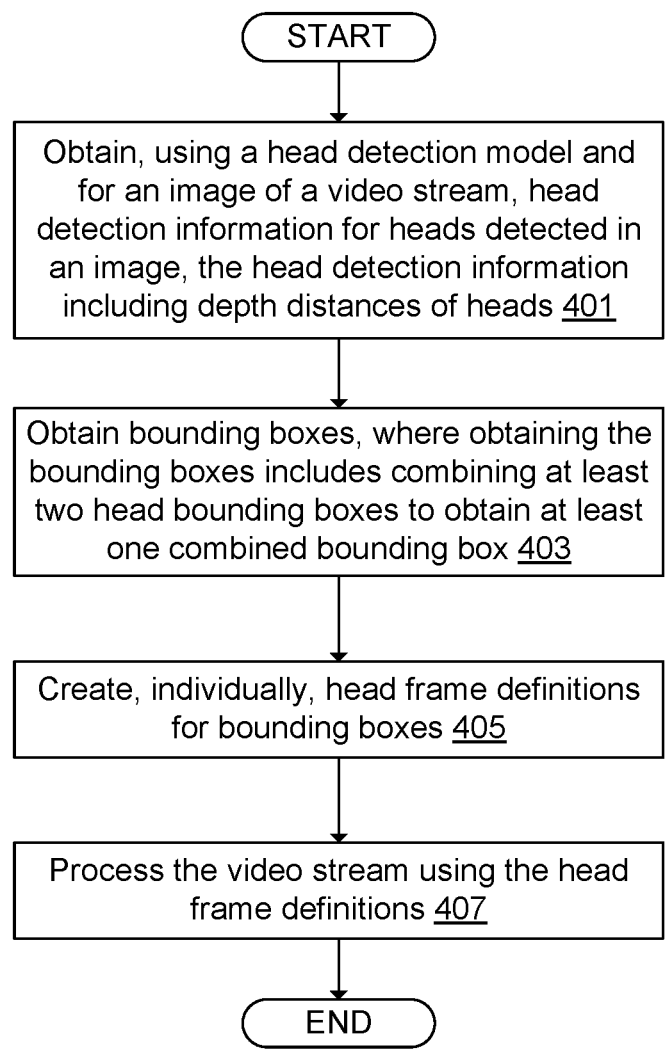
FIGS. 4, 5, and 6 show flowcharts in accordance with one or more embodiments.

FIG. 4 is a flowchart for processing a video stream to have head frames determined based on depth distances in accordance with embodiments of the disclosure. In Block 401, using a head detection model and for an image of a video stream, head detection information is obtained. The image framing processor passes an image frame to the head detection model. The head detection model is a convolutional neural network that processes the image features of the image to detect the locations of the heads in the image. The output of the head detection model is passed to the frame generator. The frame generator obtains, from the distance detector, the depth distances of the heads in the image. The depth distances are added to the head detection information.

In Block 403, bounding boxes are obtained, where obtaining the bounding boxes includes combining at least two head bounding boxes to obtain at least one combined bounding box. The head detection information identifies each head of the image and the location of each head. Depth-based rules are applied to the locations of head bounding boxes in order to determine which heads are within the same depth distance as compared to each other. For example, the depth distances between head bounding boxes may be compared to the distance thresholds to determine if the head bounding boxes should be combined. The combination may be further based on proximity and adjacency. Proximity is that the head bounding boxes are proximate to each other in the horizontal and vertical axes. Adjacency refers to the head bounding boxes not being separated on the horizontal or vertical axis to another head bounding box that is not within the same depth range. Multiple subsets of head bounding boxes may be individually combined into separate combined bounding boxes.

The combined bounding box fits the entirety of each head bounding box that is combined into the combined bounding box. Thus, combining the head bounding boxes may be performed by using the outer edges of the corresponding head bounding boxes. For example, the combined bounding box may have a top edge matching a top edge of a topmost head bounding box, a bottom edge matching a bottom edge of a bottom most head bounding box, a left edge matching a left edge of a left most head bounding box, and a right edge matching a right edge of a right most head bounding box. The combined bounding box may be a rectangle.

In Block 405, individually, the head frame definitions are created for the bounding boxes. The bounding boxes may be matched to templates. The matching may be based on the sizes of the bounding boxes (e.g., height as compared to width of each bounding box, number of heads in the bounding box, and other information). Serially or in parallel with each other for the bounding boxes, the head frame definition is generated for the bounding box using the template. The edges of the bounding boxes are aligned to the template, such as to the headlines in the template. Zooming and cropping may be performed so that the bounding box matches the alignment lines specified by the template. The result is a head frame definition that defines the zoom amount and the location within the image (e.g., bounding box for the head frame with zoom amount). The head frames may have heterogenous zoom amounts. Specifically, head frame definitions for people farther from the camera may have an increased zoom amount as compared to head frame definitions for people closer to the camera. For each head, a head frame definition is created. Because, in some embodiments, head frame definitions are created individually from the image and consider the whole image rather than partitions thereof, the head frame definitions may be overlapping.

In Block 407, the video stream is processed using the head frame definitions. For each image of the video stream, the portions of the image are selected and zoomed as defined by the corresponding head frame definitions to create head frames. The head frames may be transmitted to the downstream device.

If image frames are sent rather than individual head frames, the head frames are placed in an image frame in the locations defined by the image frame definition. The image frame is then transmitted to the downstream device. The image framing processor continues to process the images to generate the output frames. Each image of the video stream is adjusted as defined by the image frame definition to present the heads.

During video conferencing (e.g., an active conference call between endpoints), the video stream for the participants in the conference room is adjusted in real time to create an output stream having head frames. The video processor monitors the head frames and the image to determine whether reframing should be performed as described above. Thus, the heads are reframed as people move in and around the room or people enter or leave the room.

Figure 5:
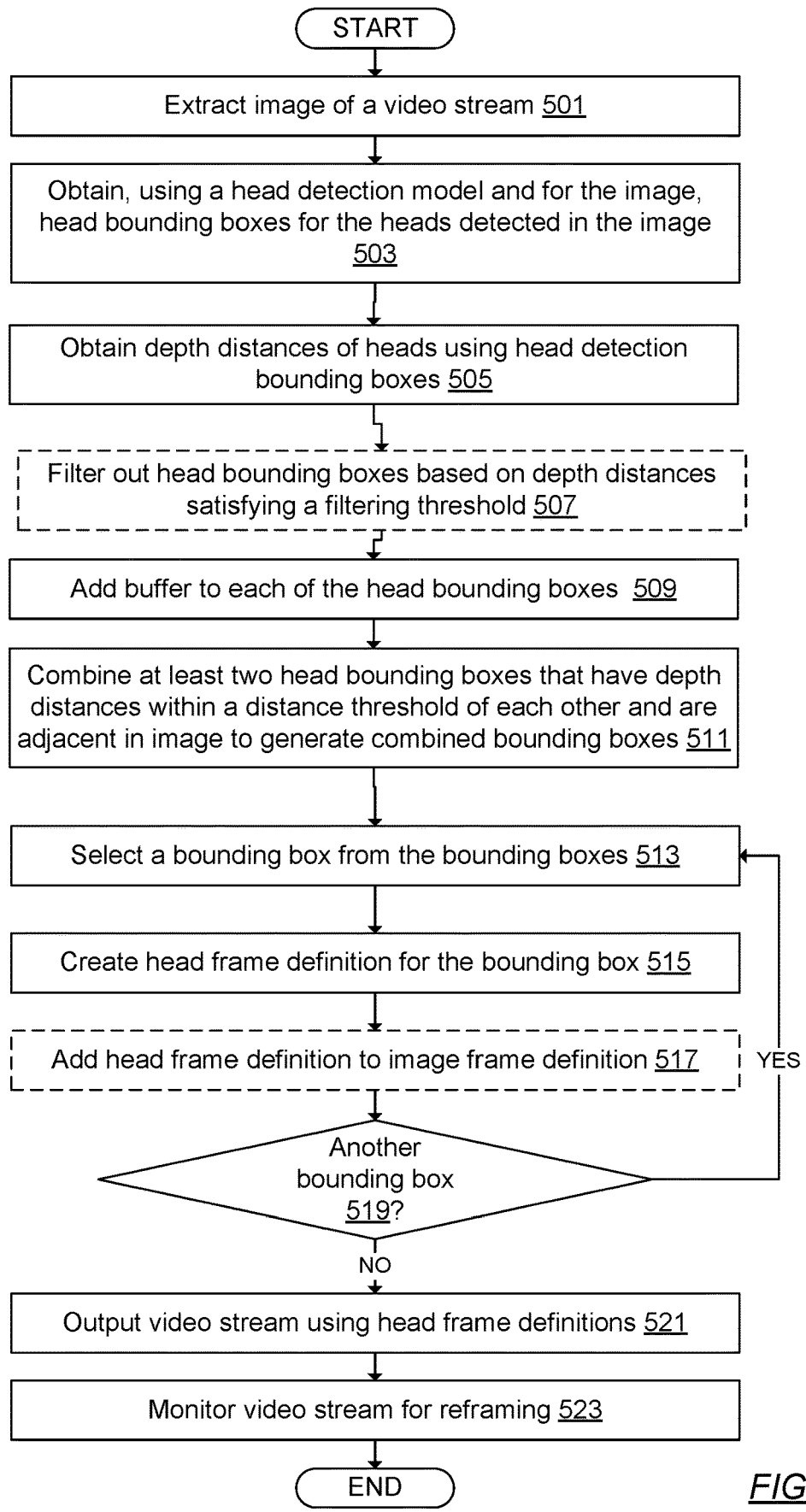

FIG. 5 shows a method of performing image framing that is more detailed than FIG. 4. Other techniques besides those describe in FIG. 5 may be used without departing from the scope of the technology. Further, in some implementations, some of the operations of FIG. 5 may be omitted or modified. In Block 501, an image of a video stream is extracted. The camera captures the video stream in real time and passes the video stream to the video processor. The video processor processes the video stream before sending the video stream to the downstream device. In the video processor, the image frame processor extracts an image from the video stream for processing. In some embodiments, the extracting of the image is a sampling of the video stream performed at a predefined interval, such as at a defined number of microseconds. Thus, at each elapse of the predefined interval, the image frame processor extracts an image for separate processing and continues to perform framing of the video stream according to the current configuration. The framing is performed by the image frame processor cropping and zooming into different parts of each image of the video stream according to the current configuration. Initially, the cropping and zooming is a default configuration. However, when a frame definition (e.g., head frame definition) is generated from the frame generator, the frame definition is applied by the image framing processor to the stream. Because a live conference call is occurring, the processing is performed quickly so as to be applicable to the current configuration of the participants being displayed. Thus, the processing described in FIG. 5 is performed in real-time to create new head frame definitions.

In FIG. 5, the image that is extracted shows heads of members of the conference (i.e., participants or people in the conference). However, the video processor has not yet detected that the image shows the heads or the configuration of the participants.

In Block 503, head detection bounding boxes are obtained for the image of the video stream. The head detection information identifies the heads detected in the image. The image frame processor transmits the image to the head detection model that is a convolutional neural network. The convolutional neural network processes the pixel values of the image through several layers to classify different parts of the image as corresponding to heads. The head detection model then outputs bounding boxes around the heads of the image. For example, the bounding boxes may be a starting coordinate, a length and a width or opposite corners of each bounding box.

Figure 6:
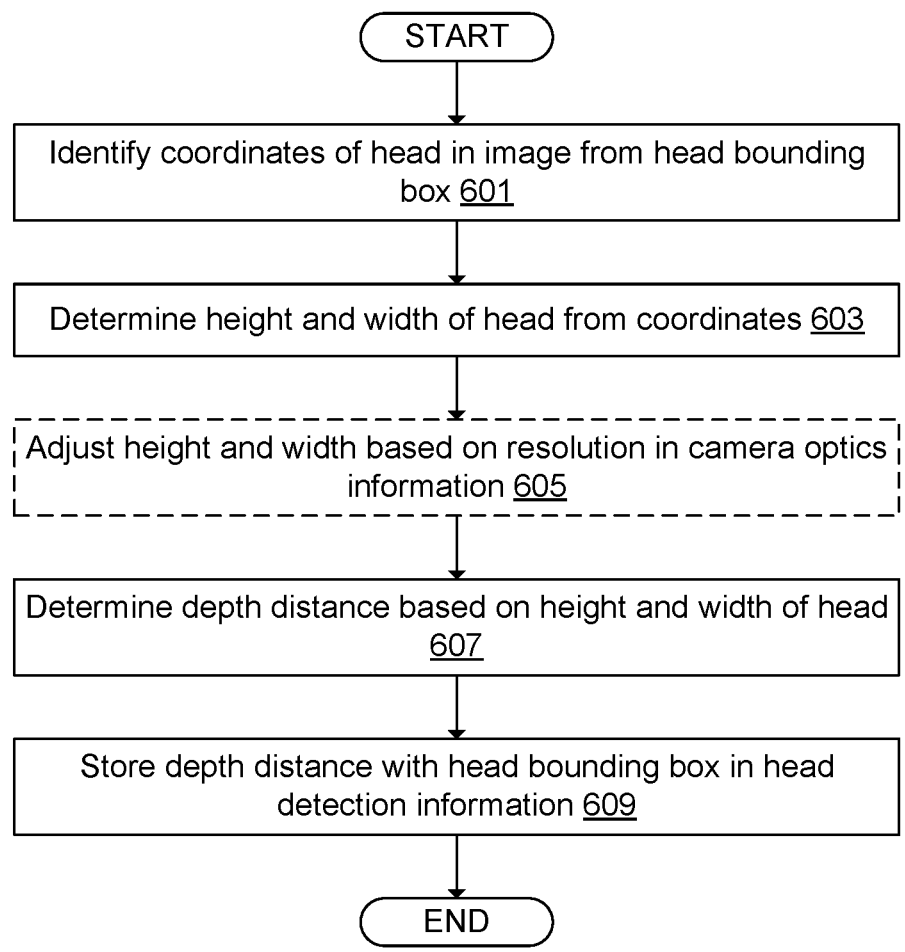

In Block 505, depth distances of heads are obtained using the head detection bounding boxes. In general, depth distances are determined based on the size of the head bounding boxes. Specifically, heads farther away from the camera are smaller in the image while heads closer to the camera are larger. Based on triangulation and an average adult head size, the depth distance may be determined. FIG. 6 shows a flowchart for obtaining depth distance for a head bounding box.

Turning briefly to FIG. 6, in Block 601, the coordinates of the head in the image is obtained from the head bounding box. In Block 603, the height and width of the head is determined from the coordinates. For example, the difference between coordinates of the corners on the vertical dimension is the height and the difference between the coordinates of the corners on the horizontal dimension is the width.

Optionally, in Block 605, the height and width are adjusted based on resolution in the camera optics information. The optics information of the camera may indicate that the camera has a different resolution than the optics of the reference, such as table or size of reference head. In such a scenario, the height and width determined in Block 603 is the camera's resolution. The height and width may be multiplied by a predefined multiplier to obtain the resolution for the reference.

In Block 607, a depth distance is determined based on the height and width of head bounding box. Determining the depth distance is based on triangulation with the reference head. A table may be first generated and used for each lookup. Thus, depth distance is determined using a table lookup. To perform the table lookup, iterative lookups are performed starting with the farthest depth distance in the table and move toward the nearest depth distance in the table. For example, in the table, the determination may be iteratively performed whether the person ten meters from camera, and if not ten meters, then nine meters, etc. The closest depth distance that the person could be is selected as the output. Thus, the height and width in the table that is just bigger than or equal to the height and width of the head bounding box is selected as the matching height and width. The depth distance of the matching height and width is then used as the depth distance of the head bounding box.

In Block 609, the depth distance is stored with the head bounding box in the head detection information. Thus, the head bounding box has an assigned depth distance.

Returning to FIG. 5, in Block 507, head bounding boxes may be filtered based on depth distances satisfying a filtering threshold. Head bounding boxes that have depth distances greater than the filtering threshold are removed whereas head bounding boxes having depth distances less than the filtering threshold are maintained for further processing.

In Block 509, a buffer is added around each of the head detection bounding boxes. The accommodates that the head detection bounding box may be too close to the head and miss ears, chins, and other close extremities of the head. Thus, the buffer may increase the height and width evenly by fifty percent. In other words, the result is a box that is twice the height and width of the bounding box.

In Block 507, at least two head bounding boxes that have depth distances within a distance threshold to each other and are adjacent in the image are combined to generate a combined bounding box. As discussed above, the distance threshold may be an absolute distance or a series of ranges for combining head bounding boxes. Head bounding boxes that have depth distances satisfying the distance threshold to be combined are combined into a combined head bounding box. In one or more embodiments, additional determinations may be performed, such as whether the head bounding boxes are adjacent (e.g., not separated in the horizontal or vertical direction by an intermediary head bounding box at a different depth distance). If the head bounding boxes are not adjacent, then despite satisfying the distance threshold, the head bounding boxes are not combined. If the head bounding boxes are adjacent, then the head bounding boxes may be combined. As another example, the combination may further be performed whether the head bounding boxes are horizontally or vertically proximate to head other, such as to satisfy a horizontal and vertical proximity threshold. By combining only head bounding boxes that are proximate to each other, such embodiments may remove unused areas of the room. The combined head bounding box is a rectangular box with the outer edges that are the same as outer edges of the head bounding boxes, with the buffer.

The process then continues to create head frame definitions for bounding boxes. In Block 513, a bounding box is selected from the set of bounding boxes that includes at least one combined bounding box and may include one or more single head bounding box. A head frame definition is created for the bounding box in Block 515. In Block 517, the head frame definition is added to the image frame definition. A determination is made whether another bounding box exists in Block 519. If another bounding box exists, the process repeats with Block 513.

Performing Blocks 513-519 is algorithmic to create an image frame of a predefined size such that the heads are approximately equal size. For combined bounding boxes, an average size of the head bounding boxes in the combined bounding boxes is determined. The zoom amount of each bounding box is adjusted such that the average size of the combined head bounding boxes and the size of the single head bounding boxes are approximately equal and fit within the image frame size. The location in the head frame definition is set according to a template. For example, The bounding box may be vertically aligned, and the zoom amount is defined such that the top head bounding box aligns with the top headline and the bottom aligns with the bottom headline. Thus, the location of the area inside of the template after the zooming and alignment is defined and added to the head frame definition.

In Block 521, the video stream is outputted using image frame definition. The image frame definition is passed to the image framing processor that adjusts the images according to the image frame definition and sends the images to the downstream device.

In Block 523, the image framing processor monitors the video stream for refreshing. Specifically, the image framing processor continues to extract images from the video stream to detect events in the video stream. For example, if the event is that heads in a head frame move, then a corresponding timer for the movement of the heads is initiated responsive to the detection. The amount of the corresponding timer is set such to account for the fact that the head(s) may immediately move back and to avoid flickering of the image. If the head(s) does not return within the elapse of the time, a reframing of the head frame definition is triggered responsive to not detecting the head in the corresponding head frame at an elapse of a threshold amount of time according to the timer.

Figure 7:
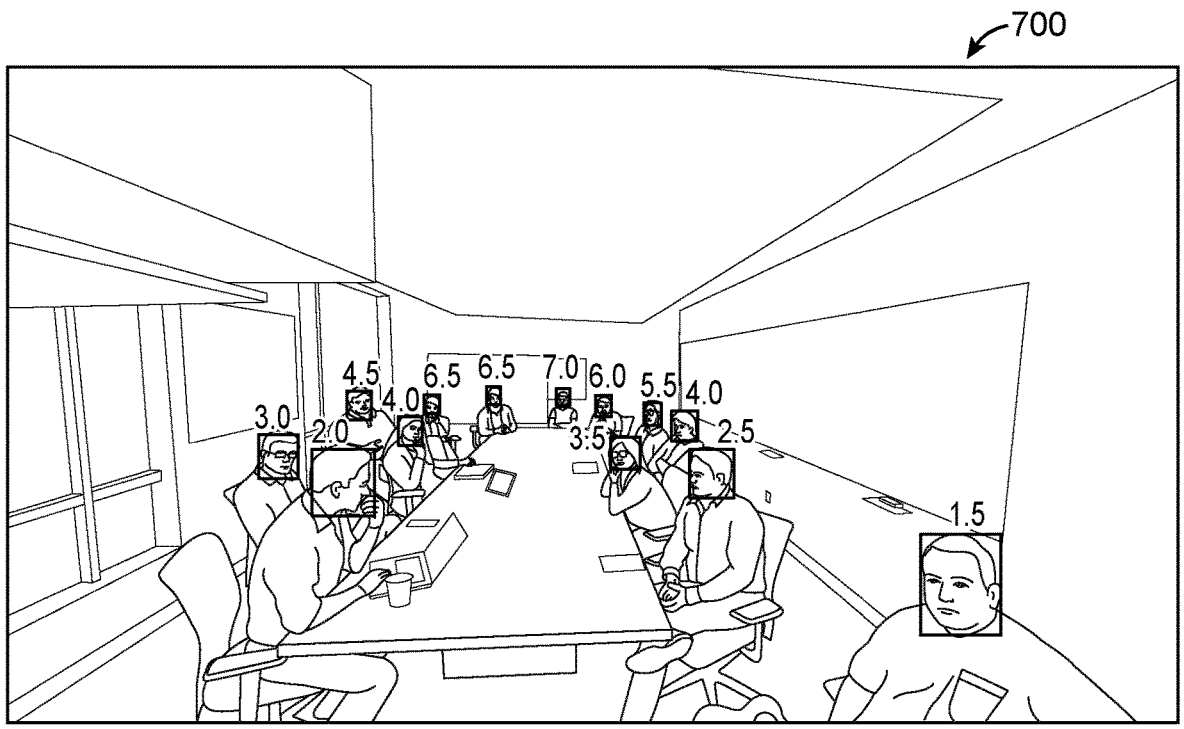
FIGS. 7, 8, and 9 show examples in accordance with one or more embodiments.
Figure 8:
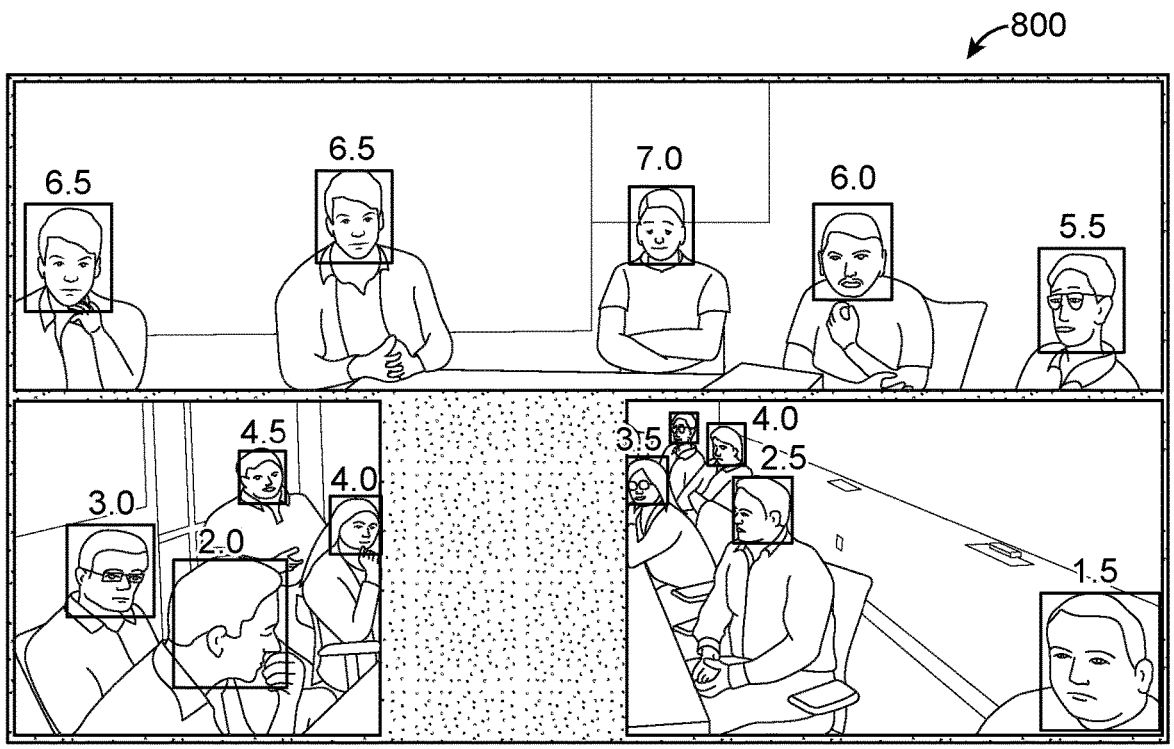
Figure 9:
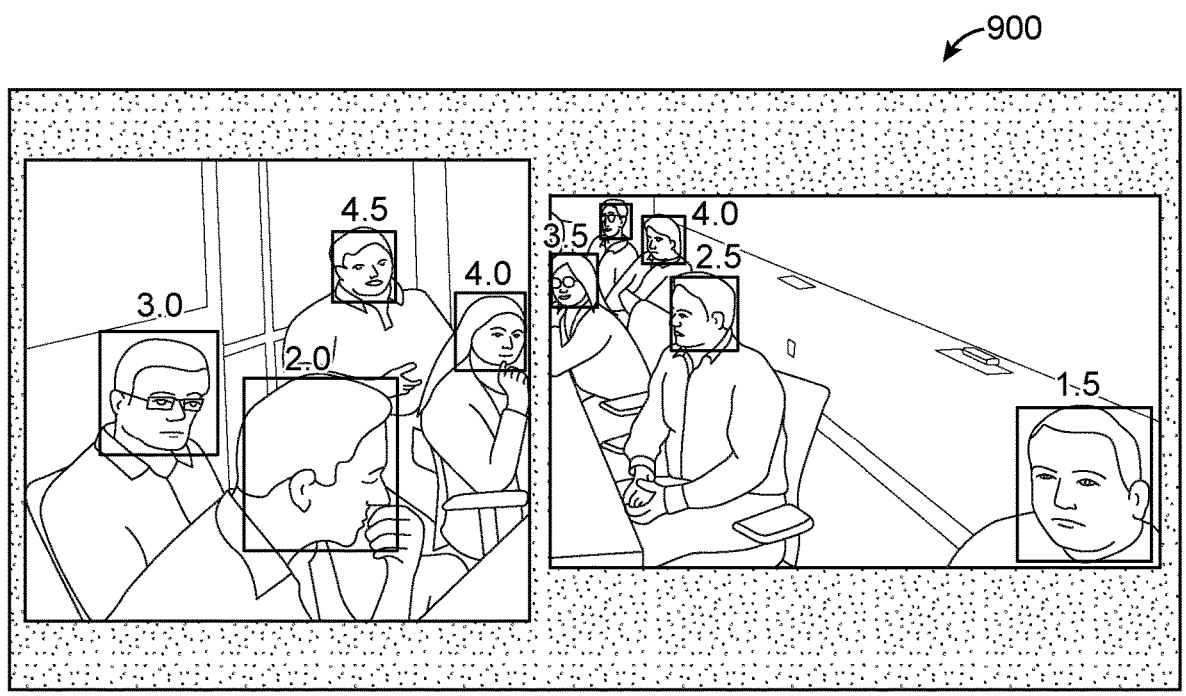

FIG. 7-9 show an example in accordance with one or more embodiments. FIG. 7 shows an example image (700) from a conference call with head bounding boxes around each person in the conference room. The numbers are the detected depth distance of each person. As shown, people distant from the camera are not clearly visible and the focus of the conference call is on the people closer to the camera. The result is a meeting inequity.

FIG. 8 shows an example image frame (800). For illustrative purposes, the head bounding boxes and depth distances are shown, but would not be present in the image frame transmitted to the remote endpoint. As shown groups of people are created based on depth distances from the camera and locations in the Field of View (FOV) of the camera. As shown by comparing FIGS. 7 and 8, two groups of people are created: People sitting less than five meters from camera and people sitting at greater than or equal to five meters from the camera. The people are further split based on sitting positions, left of the table, towards the center of the table, and on the right of the table. Namely, the far group makes the two groups within five meters to the camera to not be adjacent. Further, because of the table, the two groups within five meters to the camera are not proximate. Once the people are grouped, the head bounding boxes are combined into combined head bounding boxes. The combined bounding boxes include a first combined bounding box of people sitting on the left of the table and less than five meters from camera, a second combined bounding box of people sitting on the right of the table and less than five meters from camera, a third greater than five meters from camera. The zoom amounts are adjusted so that the people greater than five meters from the camera have the same average head size as people within five meters of the camera. Thus, the resulting image frame of FIG. 8 includes three head frames for the combined bounding boxes. When the video stream is transmitted, the head frame definitions used to create the head frames of FIG. 8 are applied to the images of the video stream to create the head frame. Thus, the remote endpoint to the conference can clear see each individual participating in the conference.

In some cases, the people greater than a defined distance may be present only for their own information and not to participate in the conference call. In such a scenario, a visual filter may be applied. FIG. 9 shows the resulting image frame (900) with the visual filter applied. As shown, the image frame excludes the group of people that have depth distances greater than five meters. Further, the head frame definitions are defined to have the average head size of each combined bounding box be approximately equal.

FIG. 10 shows an example of an endpoint (1000). The endpoint (1000) is used to participate in video conferences. Embodiments of the endpoint (1000) include video conferencing apparatuses, which may include mobile phones, laptop computers, desktop computers, tablet computers, video bars, etc. The endpoint (1000) of FIG. 10 communicates with one or more remote endpoints over a network using the network interface (1020). The endpoint (1000) includes multiple hardware and software components.

The speaker (1002) converts electrical audio signals into corresponding sound that may be heard by the users of the endpoint (1000). The speaker (1002) may be one of multiple speakers that are part of the endpoint (1000).

The microphone (1003) converts sound to corresponding electrical audio signals. The sound includes the speech of the users of the endpoint (1000). The microphone (1003) may be one of multiple microphones that are part of the endpoint (1000).

The camera (1008) converts light to corresponding electrical images and video. In one embodiment, the camera includes joints and motors to control the direction the camera is pointing and the amount of zoom of the camera. The camera (1008) may be one of multiple cameras that are part of the endpoint (1000).

The display (1010) converts electrical signal to corresponding images that may be viewed by users of the endpoint (1000). In one embodiment, the display (1010) may be a touch sensitive display that converts touch inputs from a user to electrical signals. The display (1010) may be one of multiple displays that are part of the endpoint (1000).

The bus (1012) is a communication system that transfers data between the components inside the endpoint (1000). The bus (1012) may use electrical or optical signals to transfer data between the components.

The processing unit (1013) is a collection of digital circuits that process the data and information captured and used by the endpoint (1000). The processing unit (1013) may include one or multiple processors. The processing unit (1013) executes the programs stored in the memory (1018). The programs include software instructions in the form of computer readable program code that, when executed, cause the endpoint (1000) to perform the operations of the embodiments of the disclosure.

The memory (1018) is a collection of circuits that are used to store information used by endpoint (1000). The memory (1018) stores programs and data that are executed and used by the processing unit (1013). The memory (1018) may include volatile memory and nonvolatile memory.

The network interface (1020) is the point of connection between the endpoint (1000) and other networks and endpoints. The network interface (1020) may include interfaces for wired networks (e.g., ethernet) and wireless networks (e.g., wireless local area network (WLAN), mobile phone networks, etc.).

The input/output (I/O) interface (1022) is the point of connection between the endpoint (1000) and I/O devices. The input/output (I/O) interface (1022) may include physically connected interfaces (e.g., universal serial bus (USB)) and wireless interfaces (e.g., personal area networks (PAN)). The input/output (I/O) interface (1022) may connect the endpoint to keyboards and mice, as well as to additional speakers, microphones, cameras, displays, etc.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining, using a head detection model (312) and for an image of a video stream (304), head detection information for a plurality of heads detected in the image, wherein the head detection information comprises a plurality of depth distances of the plurality of heads (401);
   obtaining a plurality of bounding boxes, wherein obtaining the plurality of bounding boxes comprises:
      obtaining a plurality of bounding boxes for the plurality of heads detected in the image (503), and
      combining at least two of the plurality of head bounding boxes into a combined bounding box according to the plurality of depth distances (403);
   creating, individually, a plurality of head frame definitions for the plurality of bounding boxes (405);
   processing the video stream using the plurality of head frame definitions (407); and
   triggering, by a plurality of timers, reframing of the plurality of head frame definitions.

2. The method of claim 1, wherein obtaining the plurality of bounding boxes further comprises:
   filtering the plurality of head bounding boxes based on the plurality of depth distance satisfying a filtering threshold (509).

3. The method of claim 1, wherein obtaining the plurality of bounding boxes comprises:
   adding a buffer to each of the plurality of bounding boxes, wherein the plurality of head frame definitions is created using the buffer.

4. The method of claim 1, wherein combining at least two of the plurality of head bounding boxes into the combined bounding box according to the plurality of depth distances comprises:
   making a determination that the at least two of the plurality of head bounding boxes have corresponding depth distances of the plurality of depth distances within a distance threshold of each other, and
   combining the at least two of the plurality of head bounding boxes based on the determination (511).

5. The method of claim 4, wherein combining the at least two of the head bounding boxes is further based on detecting an adjacency between the at least two of the head bounding boxes.

6. The method of claim 1, further comprising:
   adding the plurality of head frame definitions to an image frame definition (517), wherein processing the video stream is further based on the image frame definition (521).

7. The method of claim 1, further comprising:
   monitoring the video stream to perform a reframing based on detected movement of the plurality of heads (523).

8. The method of claim 1, wherein obtaining the head detection information comprises:
   obtaining, from the head detection model, a head bounding box for a head of the plurality of heads;
   identifying a plurality of coordinates of a head bounding box of the head (601);
   determining a height and a width of the head using the plurality of coordinates (603);
   determining a depth distance based on the height and the width of the head (607); and
   storing the depth distance with the head bounding box in head detection information (609).

9. The method of claim 8, wherein obtaining the head detection information further comprises:
   adjusting the height and the width based on resolution of camera capturing image (605).

10. The method of claim 8, wherein determining the depth distance comprises performing a table lookup of the height and the width in a table.

11. The method of claim 10, wherein the table lookup is iteratively performed starting with a farthest depth distance until a closest match to the width and the height is found.

12. A system comprising:
    a video processor (306) comprising:
       a head detection model (112) configured to generate head detection information for an image of a video stream, wherein the head detection information comprises a plurality of depth distances of the plurality of heads (401),
  a frame generator (316) configured to generate a plurality of head frame definitions for the image of the video stream, wherein generating the plurality of head frame definitions comprises:
    obtaining a plurality of bounding boxes, wherein obtaining the plurality of bounding boxes comprises:
      obtaining a plurality of head bounding boxes for the plurality of heads detected in the image (503), and
      combining at least two of the plurality of head bounding boxes into a combined bounding box according to the plurality of depth distances (403);
    creating, individually, a plurality of head frame definitions for the plurality of bounding boxes (405),
  an image framing processor (314) configured to process the video stream using the plurality of head frame definitions (407); and
  a plurality of timers (324) to trigger reframing of the plurality of head frame definitions.

13. The system of claim 12, further comprising:
a camera (302) for capturing the video stream (304).

14. The system of claim 13, wherein the video processor (306) is within a housing of the camera (302).

15. The system of claim 12, wherein the video processor (306) further comprising:
  a distance detector (328) configured to:
    obtain, from the head detection model (312), a head bounding box for a head of the plurality of heads,
    identify a plurality of coordinates of a head bounding box of the head (601),
    determine a height and a width of the head using the plurality of coordinates (603),
    determine a depth distance based on the height and the width of the head (607), and
    return the depth distance to the frame generator (316).

16. The system of claim 15, further comprising:
a camera (302) comprising a first resolution, wherein the distance detector (328) is configured to adjust the first resolution of the height and the width to a second resolution (605).

17. The system of claim 15, wherein the video processor (306) further comprising:
  a table (322) relating a plurality of heights and widths to a plurality of depth distances, wherein determining the depth distance is performed using a table lookup.

18. A method comprising:
  obtaining, using a head detection model (312) and for an image of a video stream (304), head detection information comprising a plurality of head bounding boxes for a plurality of heads detected in the image, wherein the head detection information further comprises a plurality of depth distances for the plurality of heads (401);
  filtering the plurality of head bounding boxes based on the plurality of depth distances satisfying a filter threshold (509) to obtain a filtered plurality of head bounding boxes;
  combining at least two of the filtered plurality of head bounding boxes into a combined bounding box according to the plurality of depth distances (403);
  creating a head frame definition for the combined bounding box (405);
  processing the video stream using the head frame definition (407); and
  triggering, by a plurality of timers, reframing of the plurality of head frame definitions.

19. The method of claim 18, wherein obtaining the head detection information comprises:
  obtaining, from the head detection model, a head bounding box for a head of the plurality of heads;
  identifying a plurality of coordinates of a head bounding box of the head (601);
  determining a height and a width of the head using the plurality of coordinates (603);
  determining a depth distance based on the height and the width of the head (607);
  and storing the depth distance with the head bounding box in head detection information (609).

* * * * *